(12) United States Patent
Enokida

(10) Patent No.: US 7,558,430 B2
(45) Date of Patent: Jul. 7, 2009

(54) APPARATUS METHOD AND COMPUTER-READABLE MEDIUM FOR PROCESSING HIERARCHICAL ENCODED IMAGE DATA

(75) Inventor: Miyuki Enokida, Kanagawa-Ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 700 days.

(21) Appl. No.: 11/266,298

(22) Filed: Nov. 4, 2005

(65) Prior Publication Data

US 2006/0098215 A1 May 11, 2006

(30) Foreign Application Priority Data

Nov. 8, 2004 (JP) ............................. 2004-324076

(51) Int. Cl.
*G06K 9/36* (2006.01)
*G06K 9/46* (2006.01)

(52) U.S. Cl. .................................. 382/240; 382/284

(58) Field of Classification Search ................ 382/232, 382/233, 240, 284, 299; 358/1.2; 348/699, 348/700; 375/240.11, E7.129, E7.148, E7.211, 375/E7.226, 240.1, 240.12, 240.24
See application file for complete search history.

(56) References Cited

U.S. PATENT DOCUMENTS

| | | | | |
|---|---|---|---|---|
| 5,548,708 A * | 8/1996 | Sakashita et al. | ............. | 345/501 |
| 5,760,847 A | 6/1998 | Enokida | ............. | 348/700 |
| 5,838,830 A * | 11/1998 | Qian et al. | ............. | 382/243 |
| 6,259,819 B1 * | 7/2001 | Andrew et al. | ............. | 382/248 |
| 6,393,152 B2 * | 5/2002 | Takahashi et al. | ............. | 382/233 |
| 6,473,526 B1 | 10/2002 | Enokida | ............. | 382/232 |
| 6,473,859 B1 * | 10/2002 | Enokida | ............. | 713/164 |
| 6,546,142 B2 * | 4/2003 | Katata et al. | ............. | 382/239 |
| 6,647,149 B2 * | 11/2003 | Keeney et al. | ............. | 382/240 |
| 6,668,086 B1 | 12/2003 | Enokida | ............. | 382/233 |
| 6,813,314 B2 * | 11/2004 | Aono et al. | ............. | 375/240.11 |
| 7,006,699 B2 * | 2/2006 | Malvar | ............. | 382/240 |
| 2001/0043751 A1 * | 11/2001 | Takahashi et al. | ............. | 382/240 |
| 2002/0099853 A1 * | 7/2002 | Tsujii et al. | ............. | 709/247 |
| 2002/0172428 A1 * | 11/2002 | Hosaka | ............. | 382/240 |
| 2003/0018818 A1 | 1/2003 | Boliek et al. | | |
| 2003/0067627 A1 | 4/2003 | Ishikawa et al. | ............. | 358/1.15 |
| 2004/0177155 A1 | 9/2004 | Enokida et al. | ............. | 709/236 |
| 2006/0098215 A1 * | 5/2006 | Enokida | ............. | 358/1.2 |

FOREIGN PATENT DOCUMENTS

JP 2003-023630 1/2003
JP 2004-040674 2/2004

* cited by examiner

*Primary Examiner*—Amir Alavi
(74) *Attorney, Agent, or Firm*—Fitzpatrick, Cella, Harper & Scinto

(57) ABSTRACT

An image processing apparatus reconstructs coded image data, having hierarchical encoded data structure for stepwise decoding from a low resolution toward a high resolution, in accordance with a display resolution or a display size of a decoding apparatus, thereby simplifies processing necessary for the next decoding processing. For this purpose, to optimize coded image data encoded by decomposition level=4 JPEG 2000 coding scheme (original image size is 1024×1024 pixels) for default display in resolution of 256×256 pixels, data at resolution levels 0 to 2 are decoded, thus a 256×256 resolution (image size) image is obtained. The 256×256 resolution image data, as the lowest resolution LL sub-band in the JPEG 2000 standard, is reconstructed with encoded data at resolution level=0.

7 Claims, 16 Drawing Sheets

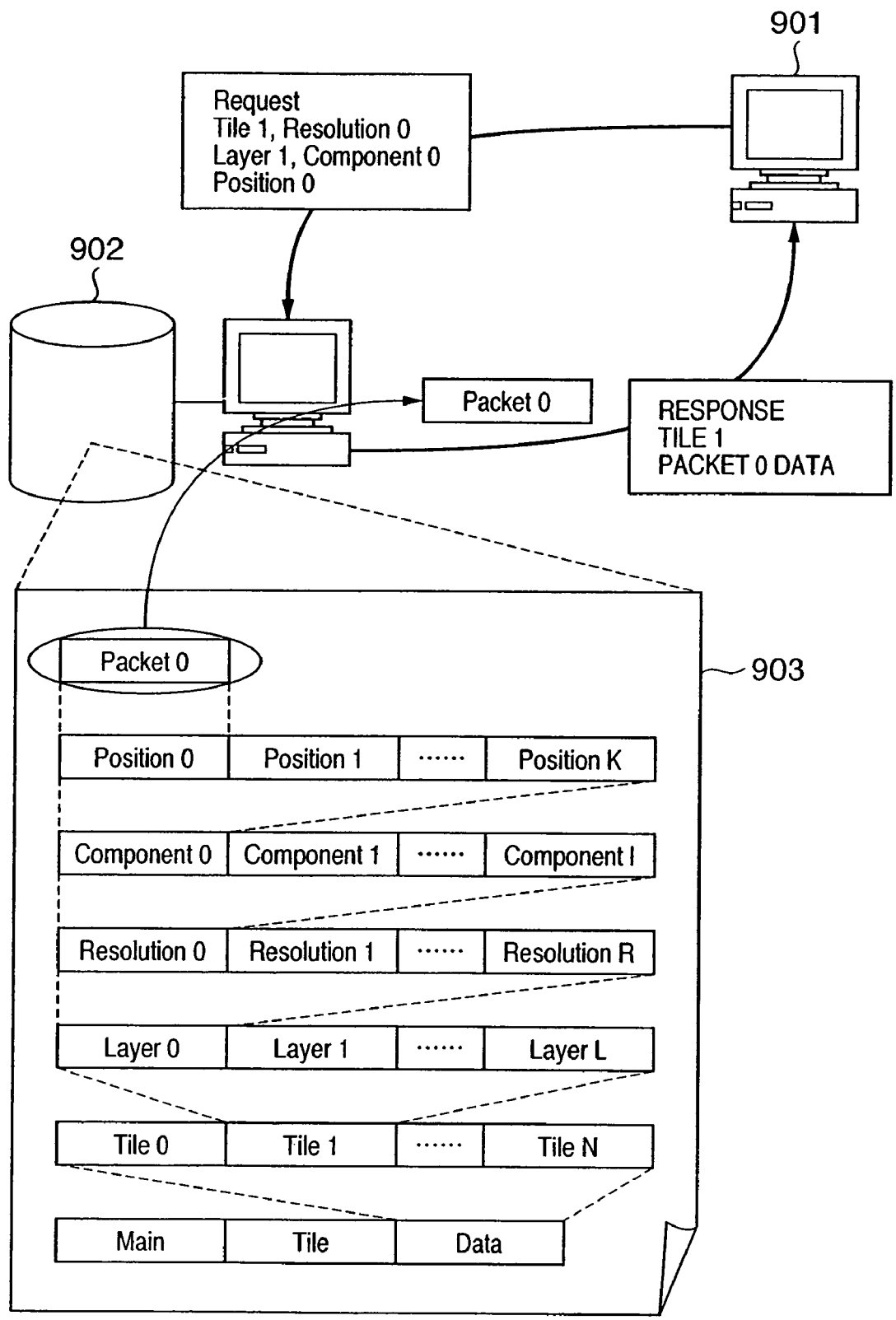

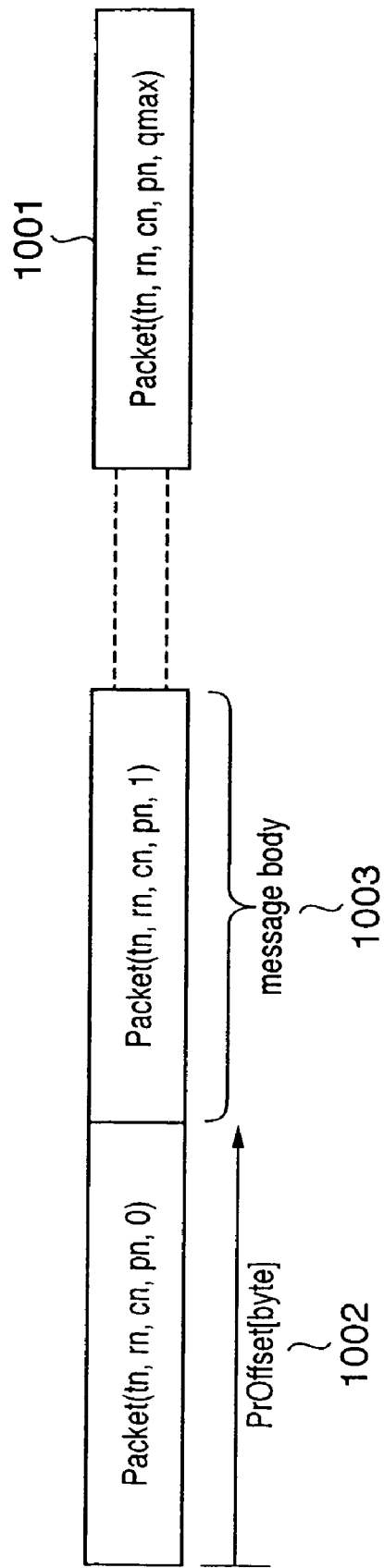

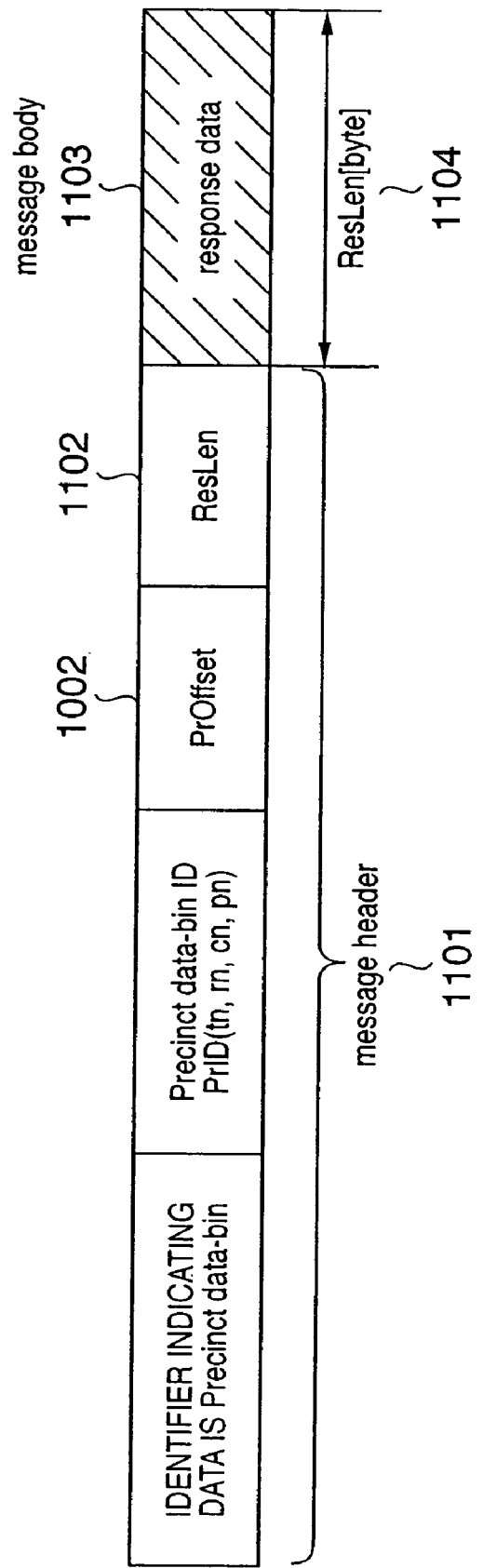

APPARATUS METHOD AND COMPUTER-READABLE MEDIUM FOR PROCESSING HIERARCHICAL ENCODED IMAGE DATA

FIELD OF THE INVENTION

The present invention relates to a technique of processing compression-coded image data.

BACKGROUND OF THE INVENTION

In recent years, the resolutions of displays used as display devices of computers have been improved in accordance with advanced technology. For example, in notebook PCs, the conventional VGA (640×480 pixels) and SVGA (800×600 pixels) resolutions are replaced with XGA (1024×768 pixels) or higher resolutions, and generally desktop PCs have SXGA (1280×1024 pixels) or UXGA (1600×1200 pixels) resolutions. Further, it is conceivable that higher resolutions such as QXGA and QUXGA are supported in the future.

Further, an application program, which simultaneously displays a large number of image data obtained by image sensing using a digital camera or the like then selectively displays one of them, and displays more detailed image data by the display techniques such as zooming and scrolling, is known. In this case, upon simultaneous display of a large number of image data, as quickness is important, previously-generated thumbnail image data different from original image data are frequently employed. On the other hand, when one image data selected from the thumbnails is displayed, the original image data is employed. The entire image is displayed as long as the image can be displayed within a window size of the application or within the screen size of the display device. Then when the image is further enlarged, a part of the image is displayed.

When one image is displayed, such application program, which uses plural image sizes smaller than an original image data size, performs decoding processing in accordance with necessity to temporarily reproduce the image data in the original image size, then reduces the image data to a target image size. In this case, the image data is not compressed or compressed by a sequential coding scheme such as the JEPG baseline.

Otherwise, image data may be compressed by a hierarchical coding scheme, then decoded to a necessary image size and displayed. Such hierarchical coding scheme, the JPEG 2000 coding is known. The JPEG 2000 scheme is an image coding scheme standardized by ISO/ITC in 2001 to divide image data to one or more tiles and perform hierarchical coding with one or plural resolutions by tile. Further, as a protocol for access to only a necessary portion of JPEG 2000 encoded data file on a network, JEPG 2000 image coding system—Part 9: Interactivity tools, APIs and protocols (hereinbelow, abbreviated to "JPIP") is currently formulated.

For example, according to Japanese Patent Application Laid-Open No. 2003-023630 (U.S. counterpart US2003/0018818A1, hereinbelow, Document 1), a compressed image file coded by the JPEG 2000 scheme is stored on a server, then a code stream is partially requested from a client, and is buffered. Regarding an unstored portion, a request is newly issued to the server, and the received encoded data and the already buffered encoded data are combined with each other, and the combined data is decoded. The above processing is repeated. The partial request is made in packet, tile or code block units in the JPEG 2000 code. Further, the request can be made in byte units. On the other hand, the server extracts a requested portion of compressed data and returns the data to the client.

Further, according to Japanese Patent Application Laid-Open No. 2004-040674 (hereinbelow, Document 2), a client requests JPEG 2000 encoded data from a server in sub-band units, and holds coefficients used upon decoding. When the client requests encoded data in a higher-layer sub-band, it performs decoding by adding the current data to the coefficients. Further, the client holds the coefficients used in the decoding. The above processing is repeated. In this system, it is not necessary to buffer received encoded data on the client side. This enables progressive display in a resolution direction.

For example, according to the Document 2, when a encoded data file "A.jk2" is obtained by encoding 2048×2048 pixel image data by the JPEG 2000 coding with decomposition level=5, six image data having different resolutions, 64×64 pixels, 128×128 pixels, 256×256 pixels, 512×512 pixels, 1024×1024 pixels, and 2048×2048 pixels, are reproduced from the file "A.j2k". Further, upon selection and display from thumbnail images by an image decoding/display application program file "APP_1.exe", the image size of display is 256×256 pixels.

Under such conditions, to display one image data selected by the application program "APP_1.exe", decoding is performed on three encoded data having resolutions 64×64 pixels→128×128 pixels→256×256 pixels and a decoded image is displayed. That is, as the application "APP_1.exe" does not handle image data having resolutions lower than the 256×256 pixel resolution, when encoded data having resolutions lower than the 256×256 pixel size exist, a decoding loop is caused in the decoder until image data having a resolution equal to 256×256 pixels or higher is decoded. Accordingly, the decoding requires much time. Further, as encoded data having resolutions not handled by the application are stored in a buffer or the like, the storage area is wasted. Further, when encoded data is requested from a server by the JPIP protocol, time for communication is further required.

Further, according to the Document 2, as the decoding processing is stopped in the middle and coefficients used in the decoding processing are held, a larger memory capacity is required in comparison with the case of holding encoded data. Further, as the decoder is stopped in the middle and sub-band data is added, a specialized decoder is required.

Further, according to the Documents 1 and 2, a part of JPEG 2000 encoded data is transmitted from the server to a client without changing compression parameters and the received encoded data is decoded without any conversion on the client side. Accordingly, it is necessary to process even encoded data having resolutions unnecessary for the application on the client side. Further, when the number of resolution layers is larger than that supported on the decoder side, there is a probability that all the received encoded data cannot be decoded.

SUMMARY OF THE INVENTION

The present invention has been made in consideration of the above problems, and has its object to provide a technique of reconstructing coded image data, having hierarchical encoded data structure for stepwise decoding from a low resolution toward a high resolution, in accordance with a display resolution or display size of an decoding side apparatus, thereby simplifying processing necessary for the next decoding processing.

To attain the object, the present invention provides an image processing apparatus for processing hierarchical encoded data having encoded data by resolution so as to stepwisely generate image data in a low resolution toward a high resolution, comprising:

specifying means for specifying a resolution of a necessary image;

decoding means for determining a position of encoded data to be decoded in hierarchical encoded data as a subject of processing based on the resolution, and decoding the encoded data; and re-encoding means for re-encoding image data, obtained by decoding the encoded data by the decoding means, with a resolution of the image data as a lowest resolution, and combining the re-encoded data with encoded data other than the position determined by the decoding means, thereby outputting new hierarchical encoded data.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a conceptual diagram of the JPIP protocol;

FIG. 10 is a conceptual diagram of precinct data-bin;

FIG. 11 is a conceptual diagram of JPIP response data;

DETAILED DESCRIPTION OF THE PREFERRED EMBODIMENTS

Preferred embodiments of the present invention will now be described in detail in accordance with the accompanying drawings.

First Embodiment

Figure 1:
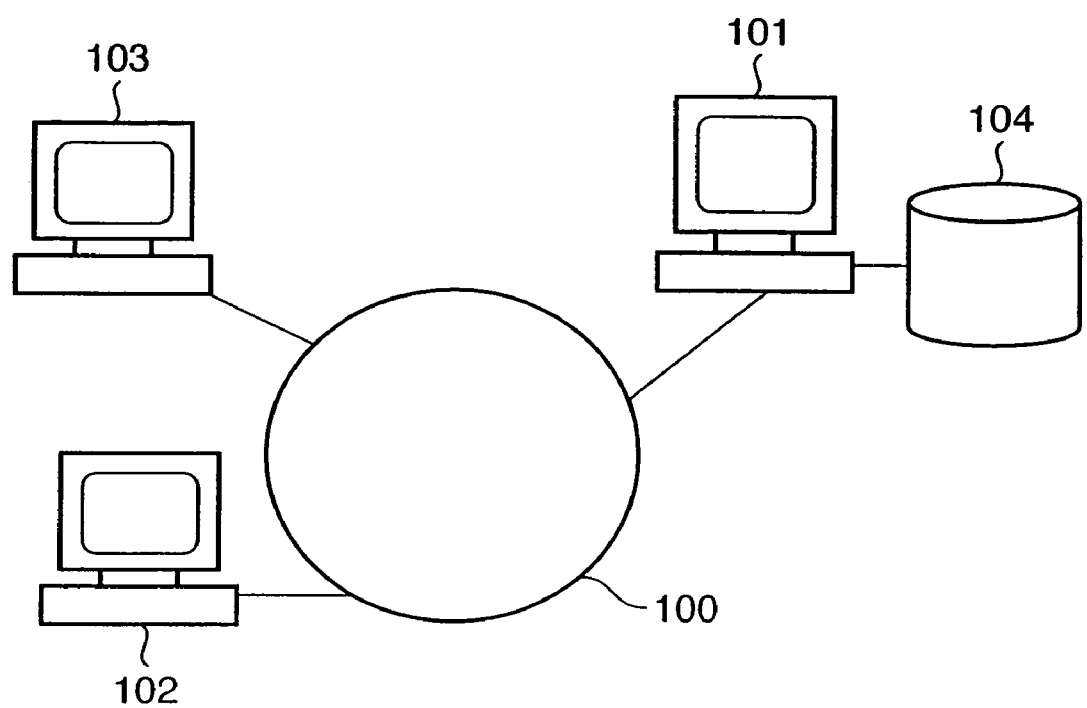
FIG. 1 illustrates a network structure according to an embodiment of the present invention.

FIG. 1 illustrates a network as typified by the Internet with which plural computers are connected. In FIG. 1, reference numeral 100 denotes a network as typified by the Internet; and 101, a server computer on which a JPIP server as a JPEG-2000 communication protocol for transmission of image data, and software necessary for WWW server functions are executed. Further, numeral 104 denotes a storage device (HDD in the embodiment) for storing a large amount of image data, in which a large number of compressed image data coded by the JPEG 2000 coding scheme are stored. Numerals 102 and 103 denote client computers (hereinbelow, "client PCs") on which client software including a Web browser necessary for display of each Web page, client software to decode/display JPEG 2000 encoded data, software having a JPIP client function and the like are executed.

Figure 2:
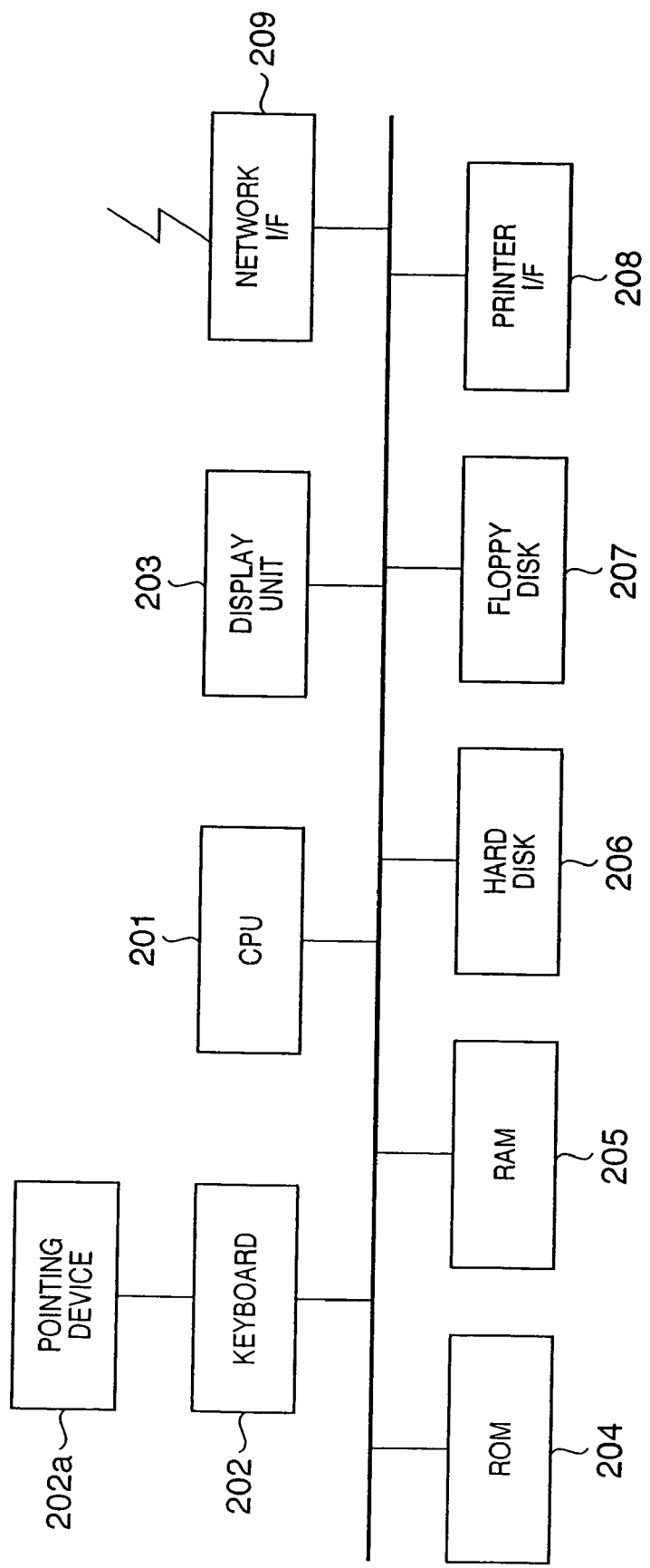
FIG. 2 is a block diagram showing a client PC in the embodiment.

FIG. 2 is a block diagram showing the client PC in FIG. 1. In FIG. 2, numeral 201 denotes a CPU which controls the entire system; 202, a keyboard which is used with a pointing device such as a mouse to input information or the like to the system; 203, a display unit having a CRT, a liquid crystal display and the like; 204, a ROM; 205, a RAM as a storage device of the system in which programs executed by the system and data utilized by the system are stored; 206, a hard disk device which holds an OS and respective client software programs, and which is used for storing various data files; 207, a floppy disk device as an external storage device used by a file system of the system; 208, a printer interface; and 209, a network interface which accesses resources on the network such as a server computer connected to the network such as the Internet. The server computer 101 in FIG. 1 basically has the configuration as shown in FIG. 2, however, the difference is that the OS and the application program stored in the hard disk function as a server.

Figure 3:
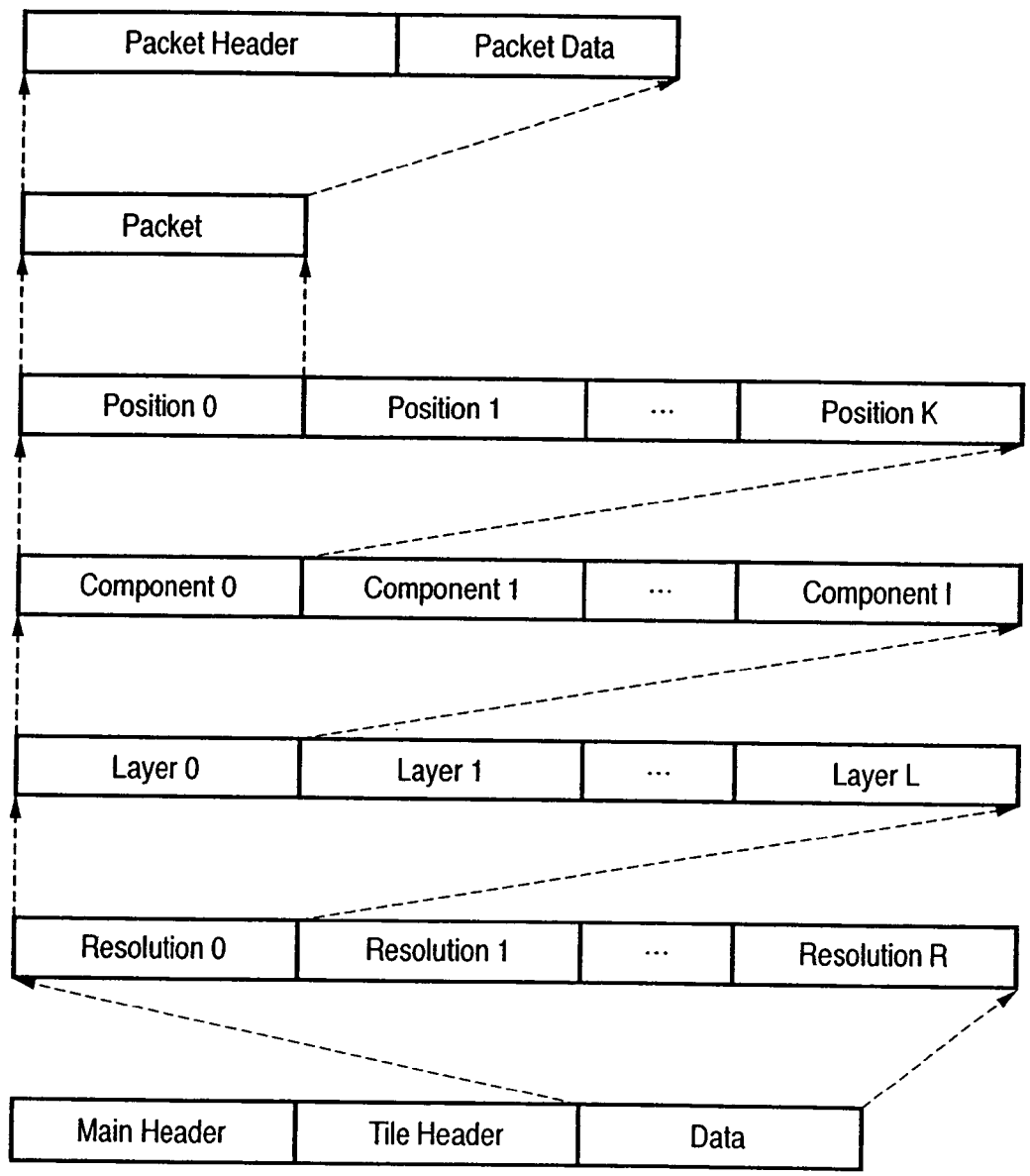
FIG. 3 illustrates the structure of encoded data by the JPEG 2000 scheme.

Next, the structure of general JPEG 2000 encoded data will be described with reference to FIG. 3. FIG. 3 shows an example of JPEG 2000 encoded data encoded by Resolution level-Layer-Component-Position progression (hereinbelow, "Resolution Progression") coding option.

In conformity with the Resolution Progression, encoded data is recorded in the order resolution/layer/component/position. Further, the SNR Progression code order may be selected. These encoded data orders are referred to as "progression orders". In the present embodiment, for the sake of simplicity of explanation, the progression order is compliant with the Resolution Progression.

Figure 4:
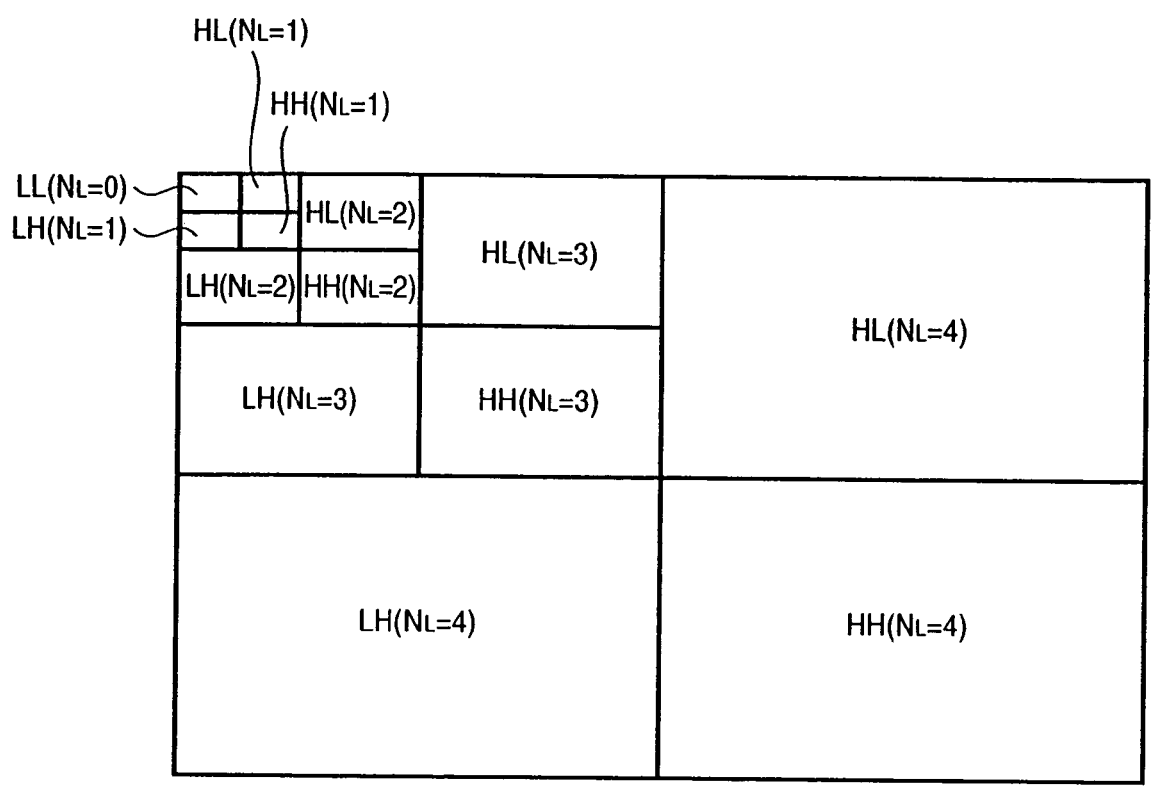
FIG. 4 is a conceptual diagram of tiles and sub-bands in wavelet transform.

Next, the relation between resolutions and sub-bands in the wavelet transform will be described with reference to FIG. 4. In FIG. 4, decomposition level=4 wavelet transform is performed. In an LL(NL=1) sub-band image, the resolution level is 0. A level=1 resolution image can be generated by decoding the LL image and three sub-bands, HL(NL=1), LH(NL=1) and HH(NL=1). A level=2 resolution image can be generated by decoding the NL=1 resolution image and NL=2 sub-bands. A level=3 resolution image can be generated by decoding the NL=2 resolution image and NL=3 sub-bands. A level=4 resolution image can be generated by decoding the NL=3 resolution image and NL=4 sub-bands. Thus 5 resolution image data can be reproduced. The image size (number of pixels in a horizontal direction and that in a vertical direction) of image data reproduced is doubled in width and height by the stepwise increment of resolution level. In the case of Resolution Progression in FIG. 3, encoded data at one resolution level is ordered from a least layer number, from a least component number, and from a least position number. In this order, the layer number corresponds to the S/N ratio with respect to an original image to be reproduced. The smaller the layer number is, the lower the S/N ratio is in the reproduced image data.

Further, respective maximum values of the resolution number, the layer number and the component number in a JPEG 2000 encoded data file are previously set by encoding parameters. Encode processing is performed in accordance with the parameters, and the parameters are stored as header information in the encoded data. Further, a packet as a minimum logical unit of encoded data has a packet header to manage the entire code-block information stored in the packet and packet data as encoded data of the entire code-block forming the packet.

In the first embodiment, decoding of a JPEG 2000 format file stored in a local position, i.e., the hard disk or the like of the client PC, will be described. In the present embodiment, a sample application displays thumbnails (head frames) of files as a list of locally-stored files in a display window, and displays a desired file in a single-image display window.

The size of each image displayed in the thumbnail display window is uniformly 64×64 pixels. The single-image display window has a window size to display 256×256 pixel image data. In the single-image display window, the image size of an initially displayed image is used as a lowest resolution size, then enlargement, reduction, scrolling and the like are performed to display higher resolution image data in accordance with a user's designation.

Further, the image size of all the thumbnail images in a local position is 1024×1024 pixels. These thumbnail image data are encoded by the JPEG 2000 coding scheme with "decomposition level=4" and "Resolution Progression". That is, the lowest resolution is 64×64 pixel size, the next lowest resolution is 128×128 pixel size, then the next resolution is 256×256 pixel size, then the next resolution is 512×512 pixel size, and the highest resolution image size is 1024×1024 pixels. That is, the hierarchical coding with five resolution types is employed.

Accordingly, in the present embodiment, in the single-image display window, image data having one of three pixel sizes, 256×256 pixels, 512×512 pixels and 1024×1024 pixels is displayed. Note that as the 512×512 pixel and 1024×1024 pixel image sizes exceed the displayable 256×256 pixel size, a part of image data is displayed in the window.

Figure 5:
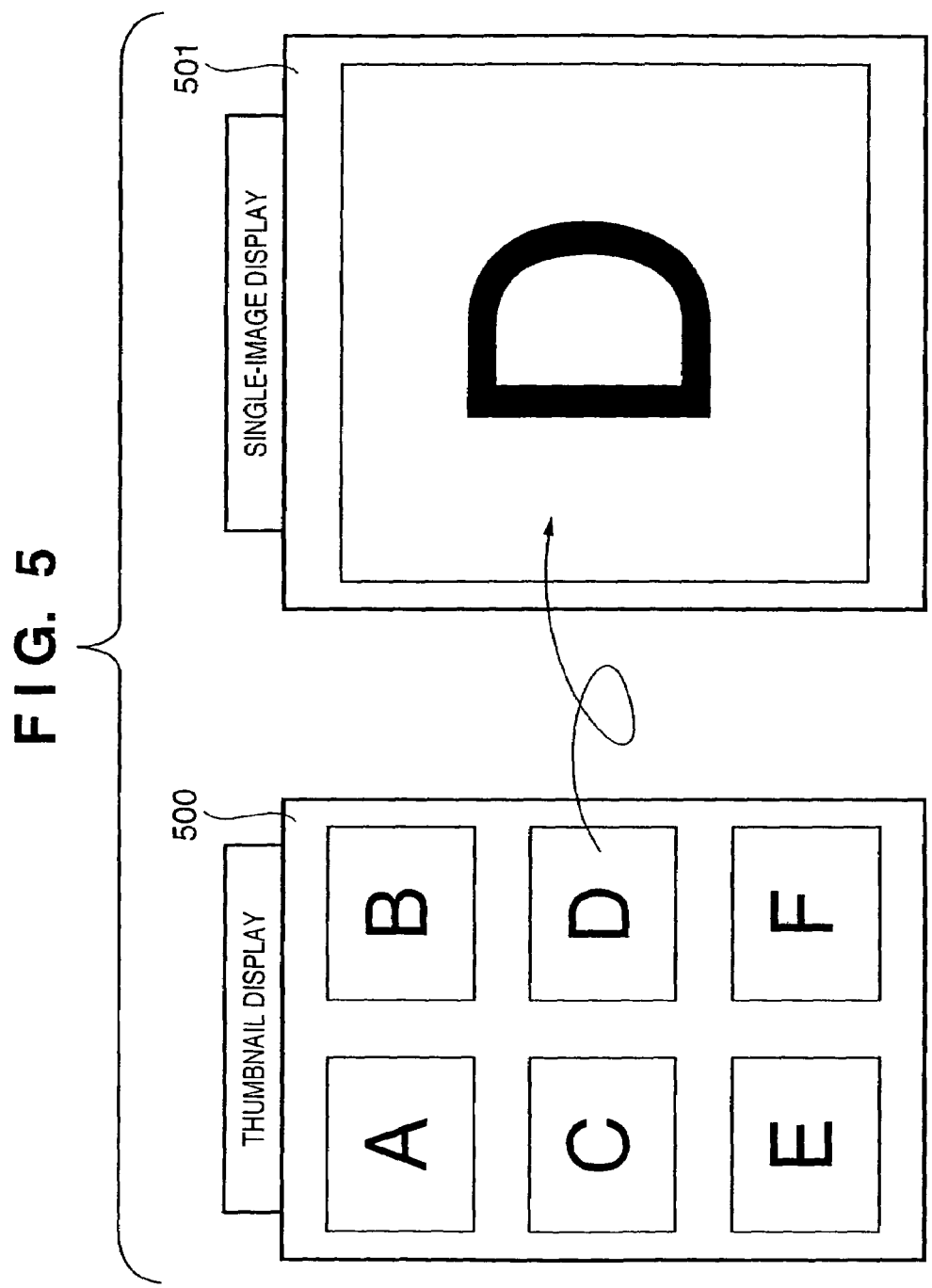
FIG. 5 illustrates a display window upon execution of an application program according to the embodiment.

FIG. 5 illustrates an example of image display by the sample application. In FIG. 5, numeral 500 denotes a thumbnail display window in which six 64×64 pixel size image data files "A" to "F" are displayed. Note that when the number of displayed image files is larger than six, a scroll bar is displayed for displaying other files. The user selects, e.g., an image "D" with the pointing device 202a or the like, then the corresponding image file "D" is selected and 256×256 pixel size image data is displayed, as a default image, in the single-image display window 501.

Figure 6:
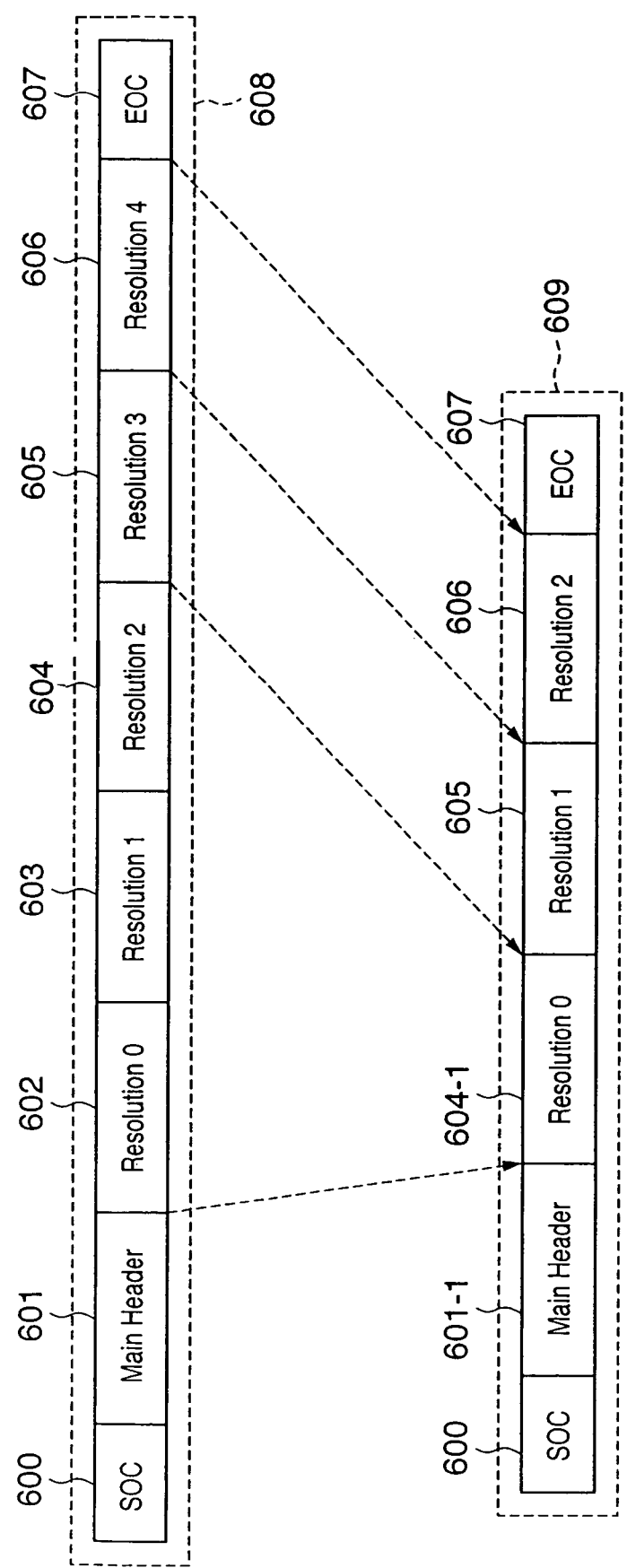
FIG. 6 illustrates the relation between original encoded data and code-converted encoded data according to the embodiment.

FIG. 6 illustrates six JPEG 2000 encoded data. In FIG. 6, numeral 600 denotes a marker code "Start of codestream" indicating the start of encoded data; and 601, a main header holding encoding parameters. For example, the main header indicates that the image size is 1024×1024 pixels and that "decomposition level=4" encoded data is stored in the "Resolution Progression". Numerals 602 to 606 denote the encoded data in the respective resolutions stored in the "Resolution Progression". Numeral 607 denotes a marker code "End of codestream" indicating the end of the encoded data.

When the image size is 1024×1024 pixels, encoded data to decode 64×64 pixel size image data is stored in a resolution level=0 area 602. That is, the LL(NL=0) encoded data in FIG. 4 corresponds to the data in the area 602.

In a resolution level=1 area 603, encoded data to decode 128×128 pixel size image data, corresponding to the sub-bands HL(NL=1), LH(NL=1) and HH(NL=1) in FIG. 4, is stored.

In a resolution level=2 area 604, encoded data to decode 256×256 pixel size image data, corresponding to the sub-bands HL(NL=2), LH(NL=2) and HH(NL=2) in FIG. 4, is stored.

In a resolution level=3 area 605, encoded data to decode 512×512 pixel size image data, corresponding to the sub-bands HL(NL=3), LH(NL=3) and HH(NL=3) in FIG. 4, is stored.

In a resolution level=4 area 606, encoded data to decode 1024×1024 pixel size image data, corresponding to the sub-bands HL(NL=4), LH(NL=4) and HH(NL=4) in FIG. 4, is stored.

Accordingly, in the present embodiment, image data, obtained by decoding the JPEG 2000 encoded data as shown in FIG. 6 up to the resolution level=0 area, is displayed in the thumbnail display window 500 in FIG. 5. As the decoding processing of the JPEG 2000 encoded data is not the main subject matter of the present invention, the explanation of this processing will be omitted.

Next, processing to display an image, indicated as "D" in the thumbnail display window 500 in FIG. 5, designated by the user, in the image display window 501 will be described.

In the present embodiment, as a 256×256 pixel image can be displayed in the image display window 501, in a default status where an image file is selected, the JPEG 2000 encoded data shown in FIG. 6 is decoded up to the resolution level=2 area 604 and displayed. As this decoding processing is similar to the decoding processing for display in the thumbnail display window, the explanation of the processing will be omitted.

Note that as the image data displayed in the image display window 501, the 256×256 pixel image data is the lowest resolution image data. When an image having a smaller image size is displayed, 256×256 pixel image data is reduced and displayed. On the other hand, when an expanded display is produced, higher resolution image data is decoded and displayed. At this time, as the size of such high resolution image data exceeds the size of the image display window 501, a part of the image is displayed and the remaining portion is displayed by scrolling processing or the like.

Otherwise, it may be arranged such that in a case where the encoded data is divided into tiles, when the image size of image data obtained by decoding is larger than the display window size, only tile(s) of a portion to be displayed is decoded, and then tile(s) of a portion which has newly become necessary by scrolling is decoded.

Next, processing to lower the decomposition level will be described with reference to FIGS. 7A and 7B and FIGS. 8A and 8B.

For the sake of simplicity of explanation, in the following description, encoded data of the image "D" is not divided into tiles (the entire image is one tile).

First, at step S701, the number of tiles of the encoded data is obtained. In this example, the number of tiles is one. Next, at step S702, the number of decoded hierarchical layers is calculated. In this case, as the image size of image data to be obtained is 256×256 pixels, an image with the desired image size can be obtained by decoding the encoded data up to the layer number "2". Accordingly, the number of layers obtained at step S702 is "2".

At step S703, decoding is performed on one layer of each tile. Since the processing is on the presumption that the decoding is always performed from the lowest resolution, the layer number "0" is set upon the first call. Every time step S703 is performed, the layer number is incremented by one. At step S704, it is determined whether or not decoding has been performed by the target number of layers by comparing the layer number set at step S703 with the layer number set at step S702. Step S703 is repeated until decoding up to the target layer is completed. In this example, decoding up to the target layer can be completed by repeating step S703 three times.

At step S705, image data obtained by the decoding is converted to display image data.

Figure 7A:
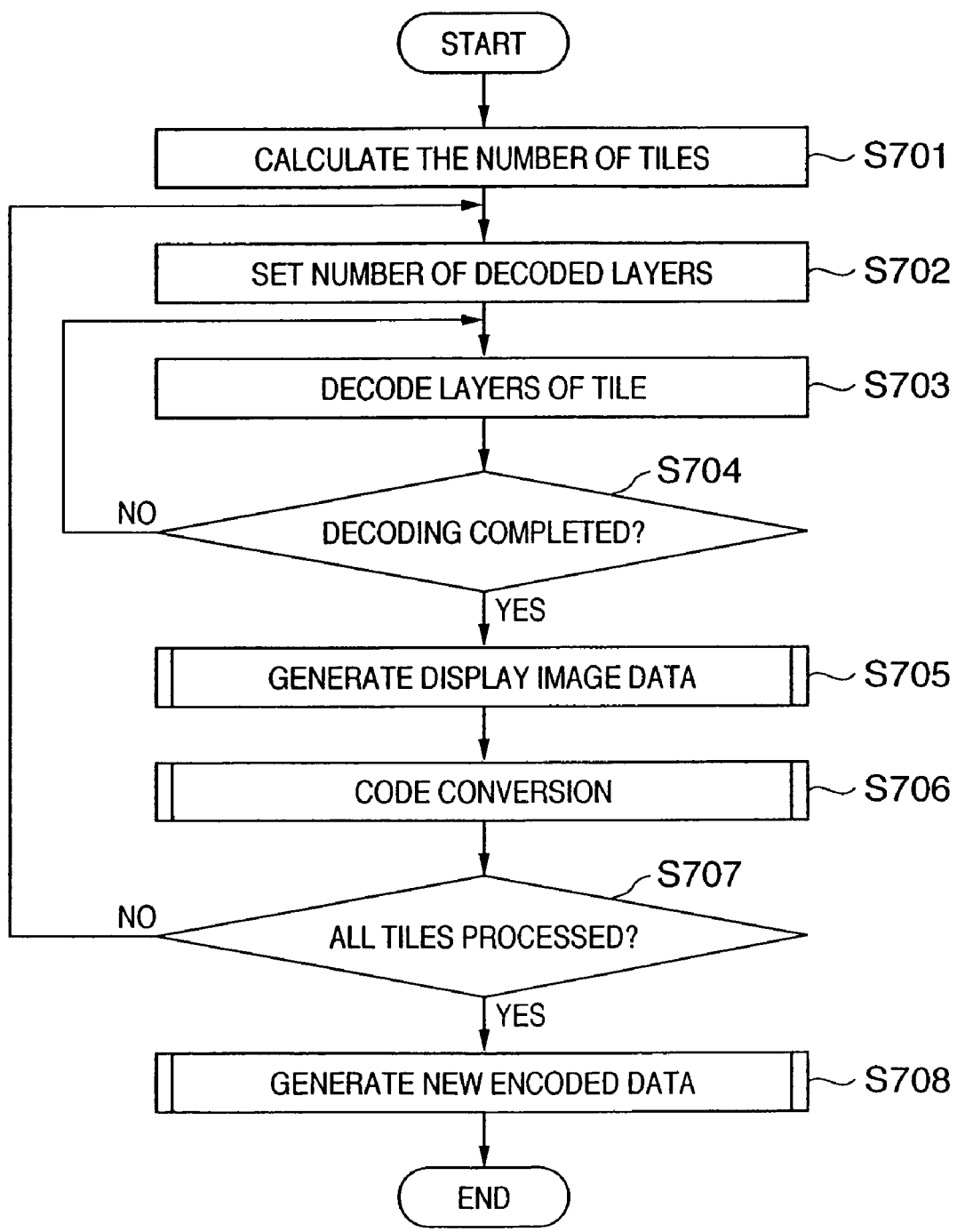
FIGS. 7A and 7B are flowcharts showing code conversion processing procedures according to the embodiment.
Figure 7B:
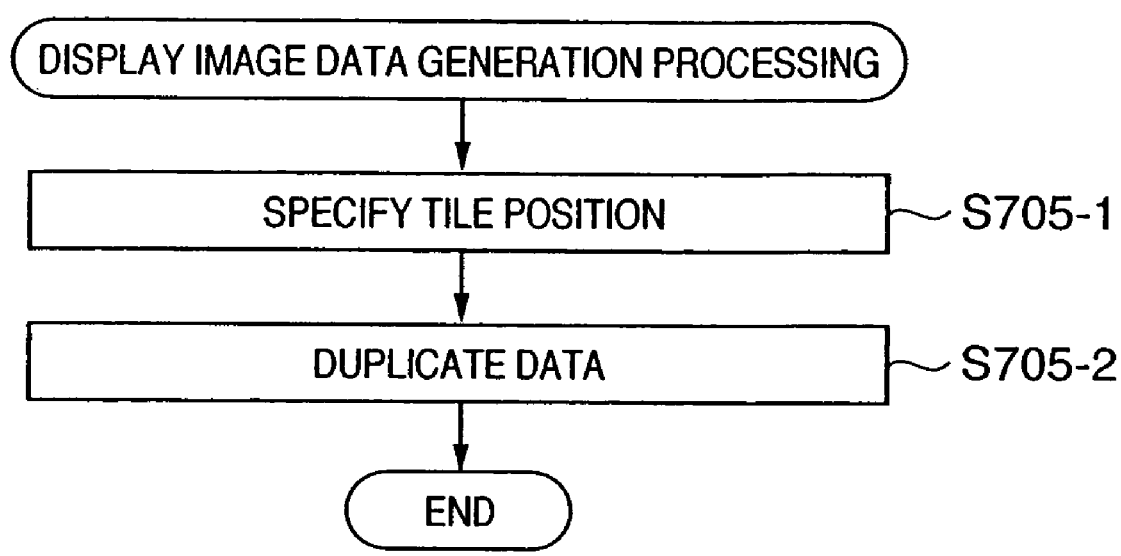

The details of step S705 is as shown in FIG. 7B. At step S705-1, the spatial position of the display image data is specified from tile number of the decoded tile. At step S705-2, the image data is duplicated in the position specified at step S705-1, then the data is converted to the format of display image data, and the process at step S705 ends.

Next, at step S706, the image data is converted to the lowest resolution LL sub-band data to reduce the number of layers. At step S707, it is determined whether or not the above-described processing on all the tiles has been completed. Steps S702 to S707 are repeated until it is determined that all the tiles have been processed. In this example, as the number of tiles is one, the process does not return from step S707 to step S702 but proceeds to step S708. Note that in a case where an original image is divided in plural tiles, the process returns to step S702. At step S708, the encoded data converted at step S706 is converted to one encoded data as new encoded data.

Figure 8A:
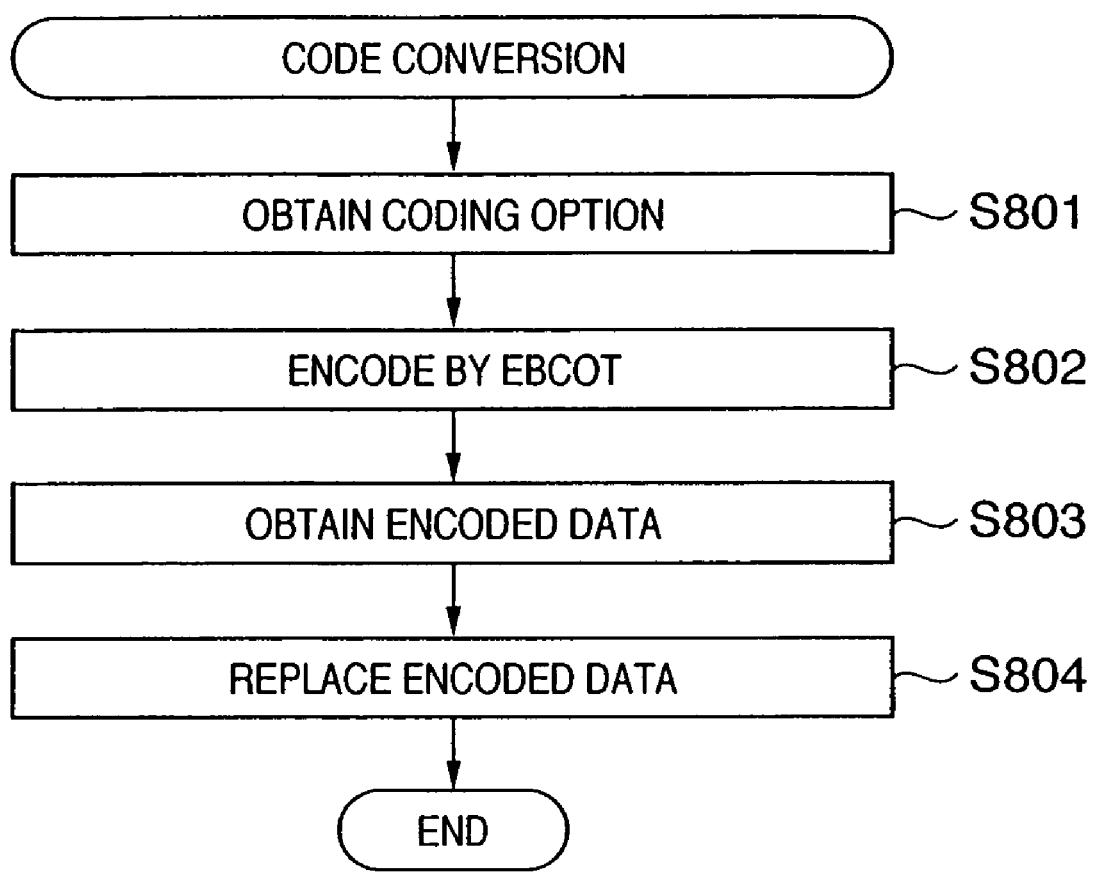
FIGS. 8A and 8B are flowcharts showing the details of the code conversion.
Figure 8B:
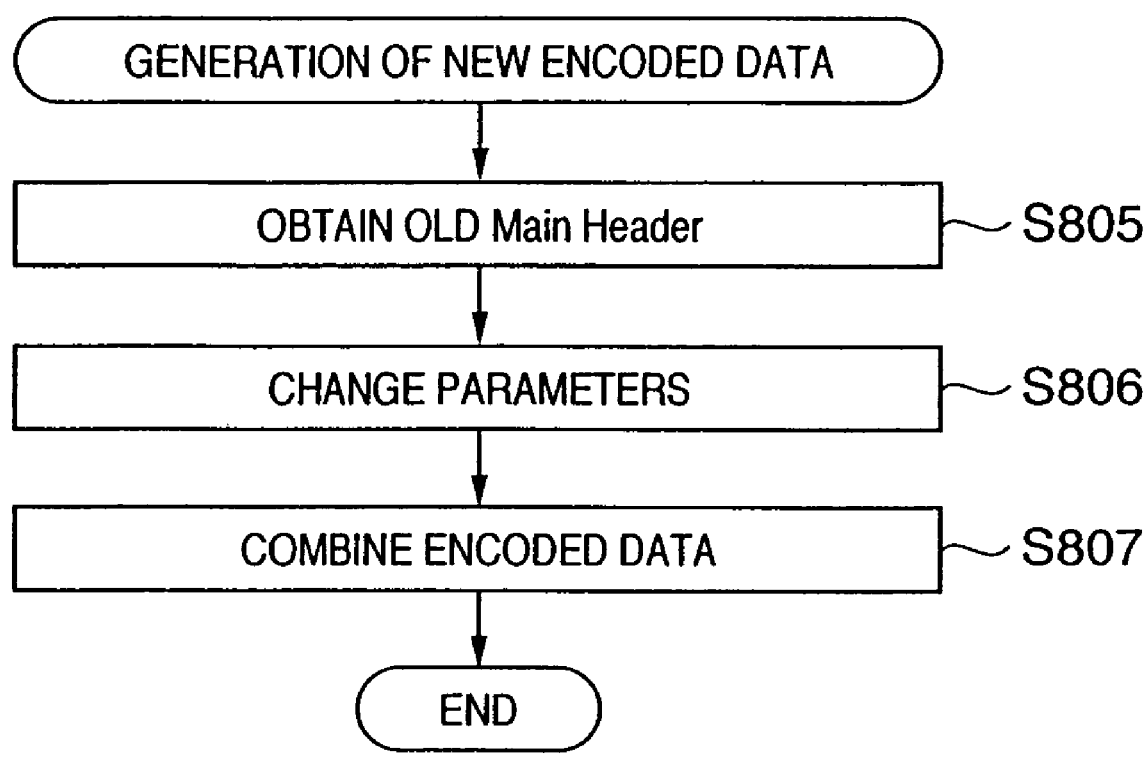

Next, the details at steps S706 and S708 will be described with reference to the flowcharts of FIGS. 8A and 8B. First, the details of the code conversion at step S706 will be described with reference to the flowchart of FIG. 8A.

First, at step S801, the coding option of the currently-decoded tile is obtained. More particularly, the marker codes such as COD, COC and QCD, QCC included in the Main Header and a Tile Part Header are retrieved thereby the coding option upon encoding is obtained.

Next, at step S802, the image data decoded at step S703 is re-encoded as LL component (LL sub-band) using EBCOT (Embedded Bitplane COding by Truncation) especially in accordance with the coding option in the LL sub-band portion of the coding option obtained at step S801. At step S803, encoded data re-encoded at step S802 is obtained, and at step S804, the old encoded data with layer numbers 0 to 2 are replaced with the encoded data obtained at step S803.

Next, the generation of new encoded data at step S708 will be described with reference to the flowchart of FIG. 8B.

First, at step S805, the Main Header of the old encoded data is obtained. At step S806, in the old encoded data, to incorporate the reduction of the number of layers at step S806 into the encoded data, a field "Number of decomposition level" in the COD marker code is changed from "4" to "2". Thus the lowest resolution image size is changed from 64×64 pixels to 256×256 pixels. Next, at step S807, the new Main Header is combined with the new encoded data of each tile generated at step S804, thereby new one encoded data is generated.

Figure 14:
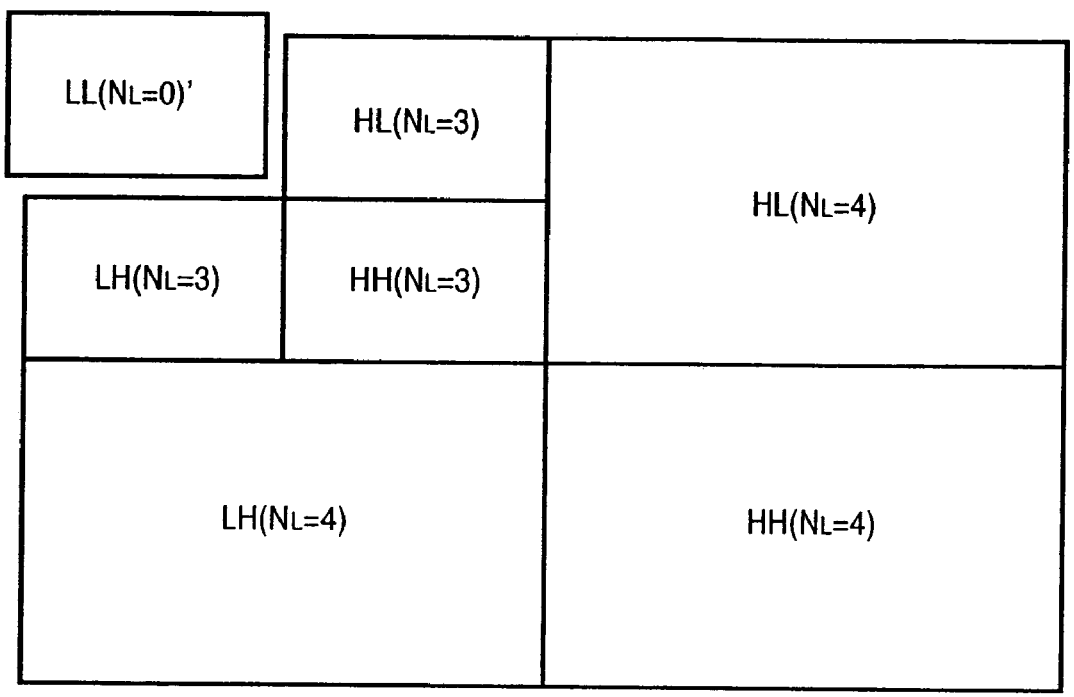
FIG. 14 is a conceptual diagram of the sub-bands in the code conversion processing.

As a particular example of sub-bands, the encoded data of the seven sub-bands LL(NL=0), HL(NL=1), LH(NL=1), HH(NL=1), HL(NL=2), LH(NL=2) and HH(NL=2) as shown in FIG. 4 are decoded, then converted to LL(NL=0)' as shown in FIG. 14. The encoded data of other sub-bands HL(NL=3) to HH(NL=4) are combined without conversion, and stored in the hard disk or the like (the number of layers is reduced).

Note that upon storage, the data may be overwritten on the file before conversion, otherwise, may be stored in a predetermined folder (directory).

By the above processings, the encoded data 608 in FIG. 6 is converted to encoded data 609. That is, the encoded data of the three layers, 602, 603 and 604, are converted to encoded data of one layer, 604-1, thereby the number of layers of the encoded data is reduced, and at the same time, the image size of the lowest resolution image data is increased.

As the encoded data is converted in correspondence with the lowest resolution image data necessary for the application by reducing the number of layers, time for the next decoding of JPEG 2000 encoded data can be reduced. For example, in the present embodiment, regarding decoding of 512×512 image data, if old encoded data is handled, data of four layers (64×64, 128×128, 256×256 and 512×512) are decoded, while if new encoded data is handled, data of two layers (256×256 and 512×512) are decoded. Thus the number of repetition of decoding can be reduced.

Further, the decoding of new lowest-resolution image data is not special decoding processing since the processing is performed upon display of lowest resolution image data by the application. Accordingly, only the re-encoding of lowest-resolution image data in the LL sub-bands is added. As the re-encoding in the LL sub-bands is made only by coding by the EBCOT without actual DWT filtering processing, the re-encoding can be performed at a very high speed.

In the present embodiment, the original encoded data is not divided in plural tiles, however, similar processing is performed in the case of encoded data divided in plural tiles. Further, the present embodiment is more effective in the case of encoded data divided in plural tiles. That is, to display high-resolution image data, as the entire image cannot be displayed within one window at once, only a part of the image is displayed then the image is scrolled by a user's operation or the like. In this case, in the case of encoded data divided in plural tiles, decoding is repeated by tile in accordance with scroll display. At this time, the decoding processing can be performed at a high speed when the number of resolution layers is small.

Note that in the above embodiment, the lowest resolution (LL sub-band) to reconstruct original coded image data is brought into correspondence with the size of image display window. However, the lowest resolution may be determined by the user's input from the keyboard or selecting a desired resolution with the pointing device from a displayed list of possible sizes (resolutions).

Second Embodiment

In the first embodiment, the encoded data is in a position where the data can be directly referred to from the user's computer. In the present embodiment, in the server/client system using the JPIP as a communication protocol, encoded data is converted on the server side.

When JPIP/JPEG 2000 encoded data is used, the user can receive only necessary data portion from the server without obtaining all the image data on the server. The data reception on the user side may be performed in packet units or tile units in the JPEG 2000 scheme. In the present embodiment, data reception on the user side from the server is performed in packet units.

FIG. 9 is a conceptual diagram showing a request and a response in packet units. A client PC 901 requests data with designation of a tile number, a resolution level and a layer number, a component number and a position number from a server 902. The server 902 analyzes the code stream of an image 903, and extracts packet data corresponding to the designated tile number, the resolution level, the layer number, the component number and the position number, and sends the packet data to the client PC 901.

Next, the structure of response data upon data transmission/reception as packet data using the JPIP protocol will be described with reference to FIGS. 10 and 11.

In the JPIP protocol, as denoted by 1001 in FIG. 10, response data is generated basically using packet data group of JPEG 2000 encoded data called "precinct data-bin". The precinct data-bin is a data group where packets of all the layers of a precinct number pn, a resolution level number rn and a component number cn in a tile tn are arrayed in ascending order of layer number.

FIG. 11 shows an example of JPIP response data generated using the Packet (tn,rn,cn,pn,1) extracted from the precinct data-bin in FIG. 10.

The JPIP response data has a message header 1101 and a message body 1103. The message body 1103 includes JPEG 2000 encoded data extracted from the precinct data-bin 1001. When the JPIP response data is generated using a Packet (tn,rn,cn,pn,1) 1003 in FIG. 10, the Packet (tn,rn,cn,pn,1) 1003 is included in the message body 1103. The message header 1101 has four parameters. The first parameter is an identifier indicating that the data included in the message body 1103 is precinct data-bin. The second parameter is a precinct data-bin ID (PrID) uniquely determined from the tile number tn, the resolution level number rn, the component number cn and the precinct number pn by the following expression.

$$PrID(tn,rn,cn,pn)=tn+(cn+s\times(\text{number of components}))\times\text{number of tiles}$$

$$s=pn+tn\times(\text{number of precincts per 1 tile at resolution level } rn)+(\text{total sum of number of precincts in tile } tr \text{ at resolution level 0 to } (rn-1))$$

The third parameter is an offset value PrOffset 1002 (FIG. 10) in the precinct data-bin of the response data. That is, the offset value indicates the byte position of the data included in the message body 1103 in the precinct data-bin 1001 with the PrID (tn,rn,cn,pn). The value of the PrOffset is equal to that of the PrOffset 1002 in FIG. 10. The fourth parameter of the message header 1101 is a ResLen 1102 indicating the byte length of the response data, i.e., the message body 1103. The value of the ResLen 1102 is that of a ResLen [byte] 1104.

In the second embodiment, encoded data similar to that in the first embodiment is stored on the server.

Figure 12:
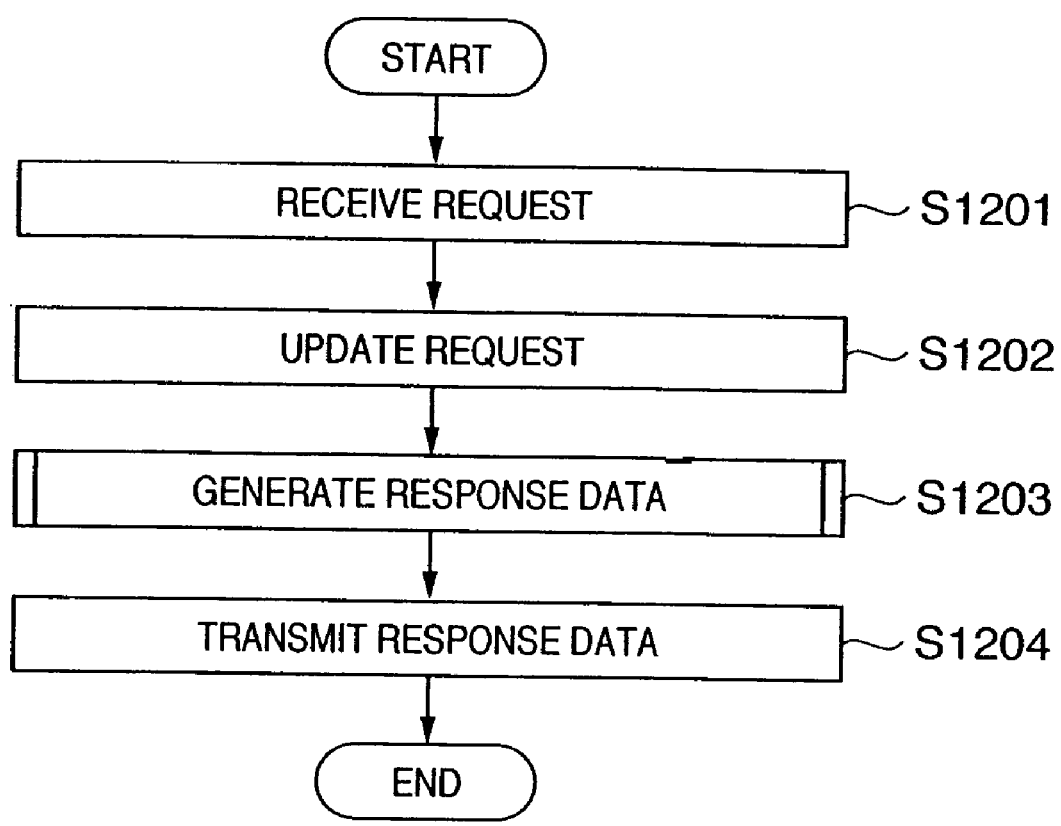
FIG. 12 is a flowchart showing the code conversion processing procedure according to a second embodiment of the present invention.

Hereinbelow, the second embodiment will be described in detail with reference to FIG. 12 and the subsequent drawings. In the following description, the client has issued a request so as to display an image in the image display window 501.

For example, the client has issued a request "http://www.image.com/jpip.cgi?target=d.jp2&fsiz=256, 256&type=jpp-stream" to the server 902. The server 902 has an address "www.image.com".

Next, processing on the server 902 will be described with reference to FIG. 12. At step S1201, the above request is received. The request character string designates a file name stored on the server with "target", an entire image size with "fsiz", and a transmission data format with "type".

At step S1202, the request character string received at step S1201 is analyzed, thereby conditions such as the name of requested file, the response data format and the response image data size can be obtained. That is, in the second embodiment, an image file "d.jp2" in 256×256 pixel size is requested in JPIP precinct data-bin response format. At step S1203, response data is generated in correspondence with the conditions. At step S1204, the response data generated at step S1203 is returned to the client.

Figure 13:
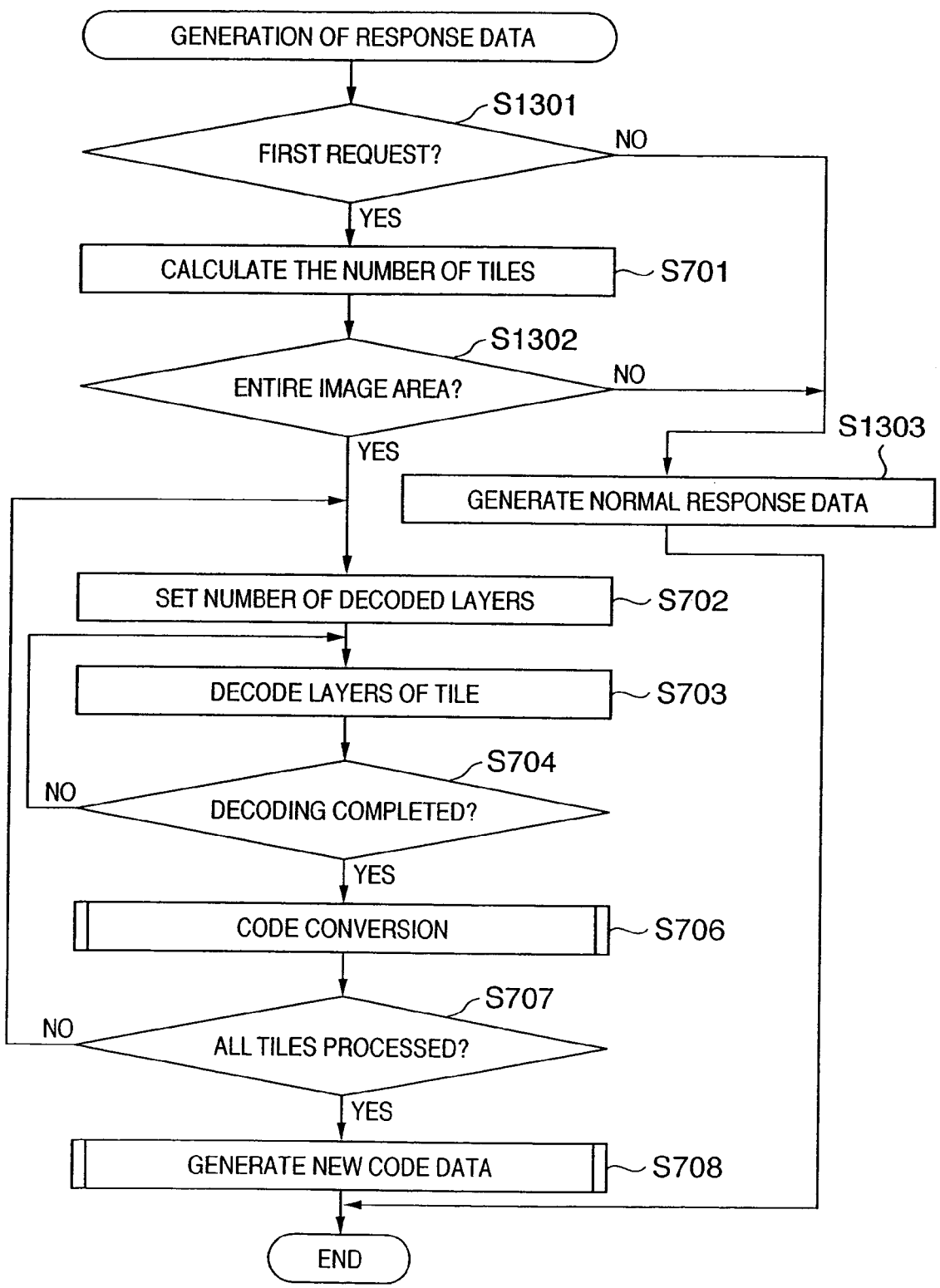
FIG. 13 is a flowchart showing the details of the code conversion according to the second embodiment.

The details of the above step S1203 will be described with reference to the flowchart of FIG. 13. As the most of this flow is the same as that described in the first embodiment, steps of the same processings have the same step numbers.

At step S1301, it is determined whether or not the current request is the first request for the target file. In the case of stateful JPIP communication, the determination can be easily made in the flow of the request. On the other hand, in the case of stateless communication, the determination can be made by utilizing log information or the like on the server.

If it is determined at step S1301 that the request has been made twice or more, the process proceeds to step S1303. If it is determined that the request is the first request, the process proceeds to step S701, at which the number of tiles of response image data is calculated. It is determined from the result of calculation whether or not the currently-requested image data corresponds to the entire image area. If it is determined that a part of the image is requested, the process proceeds to step S1303.

On the other hand, if it is determined that the entire image is requested, the process proceeds to step S702. The processing is the same as that in the first embodiment except that step S705 is omitted. Accordingly, the detailed explanation of the processing will be omitted. On the other hand, at step S1303, normal response data is generated so as to return encoded data of the requested image.

As described above, according to the second embodiment, upon first request from the client, the encoded data of a sub-band LL(NL=0)' is returned to the client. Regarding requests for encoded data in the subsequent layers, as the processing on the server is the same as the normal processing, the explanation of the processing will be omitted. Further, it is necessary for the client side to cache the received encoded data, however, the caching can be realized by the conventional caching based on the encoded data returned from the server in response to the first request.

As described above, when the entire image is requested by the first request from the client, a lowest resolution image size necessary for the application on the client side is determined, then encoded data is converted to the image size as the lowest resolution of the encoded data and returned to the client. Thus the number of bytes of the returned encoded data can be reduced, and the traffic on the network can be reduced on the client side. Further, as described in the first embodiment, the decoding time after the issuance of request can be reduced. Further, when the JPIP protocol is utilized, it is necessary for the client side to cache received encoded data, however, as the number of layers is reduced, the amount of cached data can be reduced.

Third Embodiment

In the second embodiment, the lowest resolution image size necessary for the application on the client side is presumed on the server side from the request character string issued from the client, however, the present invention is not limited to this arrangement. For example, it may be arranged such that the server and client have negotiation before communication of image data to determine the resolution, and issuance of request and data transmission are performed in accordance with the result of negotiation. The negotiation can be performed with definition as a "vendor capability" in the JPIP protocol.

Further, in the embodiments, the lowest resolution image size necessary for the application corresponds with the lowest resolution image size of the encoded data, however, the present invention is not limited to this arrangement. It can be easily understood that when the lowest resolution on the server side does not correspond with that necessary for the application, the image size to generate image data in the lowest resolution image size necessary for the application may be used as the lowest resolution image size of the encoded data. For example, the lowest resolution image size of the encoded data, which is larger than the lowest resolution image size necessary for the application, may be used.

As described above, according to the present embodiment, the lowest resolution of encoded data can be brought into correspondence with the lowest resolution image size available for the application, and decoding time can be reduced. Further, when an enlarged display is made by enlarging the image in the initial display size, the layer of encoded data to be decoded can be easily determined.

Further, as the code conversion processing is performed on image data having a small image size, the processing can be performed at a high speed. Further, as the conversion processing is DWT (Discrete Wavelet Transform) to LL sub-band data, re-encoding processing can be performed without DWT processing.

Further, when encoded data is requested from the server, corresponding data can be automatically determined by the server from the request character string. In this case, the client can easily obtain image data of the lowest resolution set by the application without awareness of coding option of encoded data managed by the server. Further, as the number of layers can be reduced, the communication amount of encoded data returned from the server can be reduced.

Otherwise, it may be arranged such that negotiation is performed between the server and the client before image data communication and the statuses of both sides are accurately informed. Further, the negotiation can be implemented as the "vendor capability" of the JPIP.

Note that as it is apparent from the above embodiments, as the primary part of the present invention is a computer program executed by a computer, such computer program is included in the scope of the present invention. Further, a computer program is generally stored in a computer-readable storage medium such as a CD-ROM and is executable when it is duplicated or installed into a system from the storage medium set in a computer, such computer-readable storage medium is also included in the scope of the present invention.

As described above, according to the present invention, coded image data, having hierarchical encoded data structure for decoding from a low resolution toward a high resolution, can be reconstructed in accordance with a display resolution or a display size of a decoding apparatus. Further, processing necessary for the next decoding processing can be simplified.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-324076, filed on Nov. 8, 2004, which is hereby incorporated by reference herein.

What is claimed is:

1. An image processing apparatus for processing hierarchical encoded data having encoded data by resolution so as to stepwisely generate image data in a low resolution toward a high resolution, comprising:
   specifying means for specifying a resolution of a necessary image;
   decoding means for determining a position of encoded data to be decoded in hierarchical encoded data as a subject of processing based on the resolution, and decoding the encoded data; and
   re-encoding means for re-encoding image data, obtained by decoding the encoded data by said decoding means, with a resolution of the image data as a lowest resolution, and combining the re-encoded data with encoded data other than the position determined by said decoding means, thereby outputting new hierarchical encoded data.

2. The image processing apparatus according to claim 1, wherein said re-encoding means includes means for rewriting a header describing coding conditions of the hierarchical encoded data as the subject of processing with coding conditions for re-encoding.

3. The image processing apparatus according to claim 1, wherein said specifying means specifies the resolution based on request information received via predetermined communication means from a client terminal on a network,
   and wherein said apparatus further comprising] further includes means for transmitting the hierarchical encoded data re-encoded by said re-encoding means via said communication means to the client terminal.

4. The image processing apparatus according to claim 3, wherein communication with said client terminal is performed by using the JPIP protocol.

5. The image processing apparatus according to claim 1, further comprising display control means for displaying a list window to display a list of files of hierarchical encoded data as subjects of processing and an image display window to display an image decoded from a selected hierarchical encoded data,
   wherein said specifying means specifies the resolution based on a size of said image display window.

6. A control method for an image processing apparatus for processing hierarchical encoded data having encoded data by resolution so as to stepwisely generate image data in a low resolution toward a high resolution, comprising:
   using a processor to perform the steps of:
      a specifying step of specifying a resolution of a necessary image;
      a decoding step of determining a position of encoded data to be decoded in hierarchical encoded data as a subject of processing based on the resolution, and decoding the encoded data; and
      a re-encoding step of re-encoding image data, obtained by decoding the encoded data at said decoding step, with a resolution of the image data as a lowest resolution, and combining the re-encoded data with encoded data other than the position determined at said decoding step, thereby outputting new hierarchical encoded data.

7. A computer-readable medium having stored thereon sequences of instructions which when read and executed by a computer, cause the computer to function as an image processing apparatus for processing hierarchical encoded data having encoded data by resolution so as to stepwisely generate image data in a low resolution toward a high resolution, comprising:
   specifying means for specifying a resolution of a necessary image;
   decoding means for determining a position of encoded data to be decoded in hierarchical encoded data as a subject of processing based on the resolution, and decoding the encoded data; and
   re-encoding means for re-encoding image data, obtained by decoding the encoded data by said decoding means, with a resolution of the image data as a lowest resolution, and combining the re-encoded data with encoded data other than the position determined by said decoding means, thereby outputting new hierarchical encoded data.

* * * * *